(12) United States Patent
Naganuma

(10) Patent No.: US 6,554,502 B2
(45) Date of Patent: Apr. 29, 2003

(54) LIGHT QUANTITY CONTROLLER

(75) Inventor: Hiroaki Naganuma, Kofu (JP)

(73) Assignee: Nisca Corporation, Minamikoma-gun (JP)

( * ) Notice: Subject to any disclaimer, the term of this patent is extended or adjusted under 35 U.S.C. 154(b) by 0 days.

(21) Appl. No.: 09/950,620

(22) Filed: Sep. 13, 2001

(65) Prior Publication Data

US 2002/0034389 A1 Mar. 21, 2002

(30) Foreign Application Priority Data

Sep. 14, 2000 (JP) ........................................ 2000-280868

(51) Int. Cl.$^7$ ................................................. G03B 9/40
(52) U.S. Cl. ........................ 396/454; 396/486; 396/493
(58) Field of Search ............................... 396/459, 462, 396/454, 486, 463, 467, 493, 469

(56) References Cited

U.S. PATENT DOCUMENTS 6,099,171 A  *  8/2000  Takahashi .................... 396/451

FOREIGN PATENT DOCUMENTS

JP           10-221740           8/1998

* cited by examiner

Primary Examiner—David M. Gray
(74) Attorney, Agent, or Firm—Kanesaka & Takeuchi

(57) ABSTRACT

A light quantity control apparatus includes a first base plate, at least one drive device mounted on the first base plate, a shutter blade mounted on the first base plate and engaging the drive device, an intermediate plate disposed above the shutter blade, a diaphragm blade disposed above the intermediate plate, a second base plate disposed above the diaphragm blade, and a protruding guide formed on the first base plate to support the shutter blade thereon. The protruding guide includes a closing region where the shutter blade completely closes the opening, an opening region where the shutter blade opens the opening, and an inclined surface formed at the closing region and/or the opening region. The inclined surface gradually narrowing a gap with respect to the intermediate plate so that a movement of the shutter blade is reduced by the inclined surface to prevent rebounding thereof.

7 Claims, 11 Drawing Sheets

LIGHT QUANTITY CONTROLLER

BACKGROUND OF THE INVENTION

1. Field of the Invention

The present invention relates to a light quantity control apparatus used in various camera devices such as video cameras and still cameras. Specifically, it relates to a light quantity control apparatus such as a diaphragm for regulating the amount of light in a photographing operation or a shutter for blocking the light in a photographing operation.

2. Description of the Related Arts

This type of light quantity control apparatus is comprised of a ring shape base plate integrated in the photographing lens part and having an optical axis aperture, one or a plurality of blade members revolvingly mounted to this base plate and a border on the aperture, and an electro-magnetic drive unit interlocked to the blade member and mounted to said base plate. By applying an electric current to this electro-magnetic drive unit, said blade member revolves and the aperture is blocked or the diameter of the aperture is reduced.

Tokkaihei 10-221740 describes shutter blades that block the optical axis aperture and the stop blades that regulate the size of the optical axis aperture overlapped on one base plate via an intermediate plate to adjust the quantity of light and to open and close the shutter.

Such a structure has the problem of the blade members rebounding and returning to the opposite direction when they are closed if opened or closed with force at high speed. This problem is notable with a stopper means to regulate that operation is established between the drive device and the blade members. Conventionally, the amount of rebounding is considered so the range for blade movement is enlarged. Therefore, the light quantity control apparatus becomes larger thereby creating the problem of difficulty in incorporating them into a lens barrel where space is limited.

SUMMARY OF THE INVENTION

An object of the present invention is to provide a light quantity control apparatus that has a small diameter around the optical axis of a photographic lens enabling arrangement and is capable of securely opening and closing blade members at high speeds.

In order to achieve the aforementioned purpose, this invention is composed as follows.

First, at least two drive means are mounted to the first base plate having an optical axis and shutter blades are arranged to the first base plate. Next, the light quantity apparatus comprises the overlapping intermediate plate, stop blades and the second base plate in that order, and on the first base plate, a protruding guide to guide the swinging of the shutter blades. Near the closing region and/or the opening region of this protruding guide an inclined surface is formed to gradually narrow the gap with the intermediate plate. Further, the shutter blades are formed by the vertical overlapping of at least two blade materials. The protruding guide is composed of a first guide member to guide the upper level blade and a second guide member to guide the lower level blade. The second guide member is formed with an inclined surface so it is possible to prevent the rebounding of the shutter blades when they are opened or closed.

In addition, these two guide members can be configured so that the first guide member is higher than the second guide member and that difference in height is part larger than the thickness of the shutter blade and that difference in height is smaller than the thickness of the shutter blade or the second guide member side is configured so that the oblique portion becomes larger thereby comprising an operating part in which more than two shutter blade members have little friction and a control portion which conversely has large friction for optimum closing and opening.

Also, it is possible for the structure of this invention to have a plurality of protrusion guides formed in the shutter's opening and closing region.

First, the optimum embodiment is to have at least two drive means mounted to the first base plate having an optical axis and shutter blades arranged to the first base plate. Next, the light quantity apparatus comprises the overlapping intermediate plate, stop blades and the second base plate in that order, an interlock means to interlock one of the aforementioned drive means and the aforementioned shutter blades, a stopper means to regulate the opening region and closing region, a protruding guide to guide the swinging of the shutter blades disposed on the first base plate, and an inclined surface formed to gradually narrow the gap with the intermediate plate near the closing region and/or the opening region of this protruding guide.

DETAILED DESCRIPTION OF THE DRAWINGS

FIG. 3($b$) is a drawing showing an embodiment of the present invention and it is a partial cross-sectional view showing the required parts of a light quantity control apparatus.

DETAILED DESCRIPTION OF THE PREFERRED EMBODIMENTS

Figure 1:
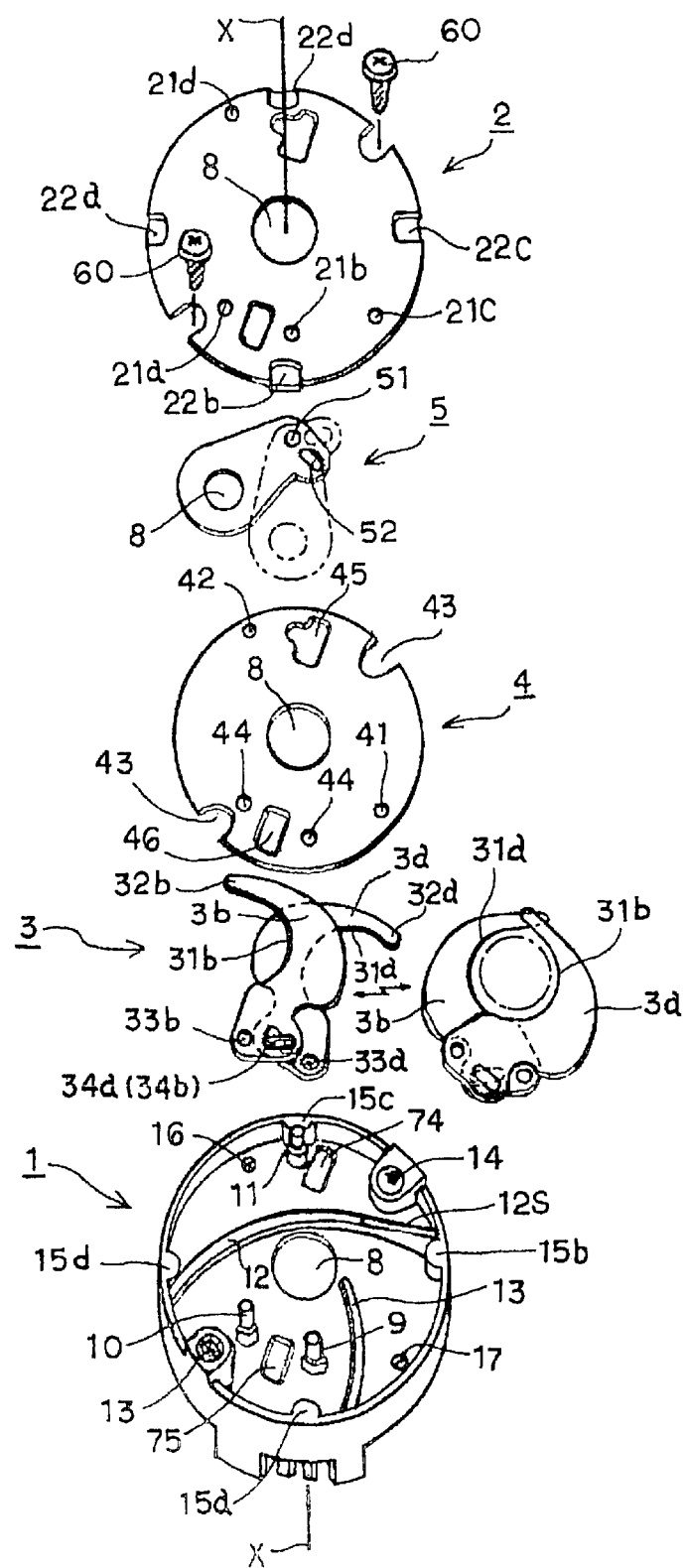
FIG. 1 is a drawing showing an embodiment of the present invention and it is an exploded view showing the front side of a light quantity control apparatus.

The following is a detailed explanation of the preferred embodiment of the present invention based on the drawings provided.

Below, working modes of the present invention will be explained based on the embodiments shown in the drawings.

Figure 2:
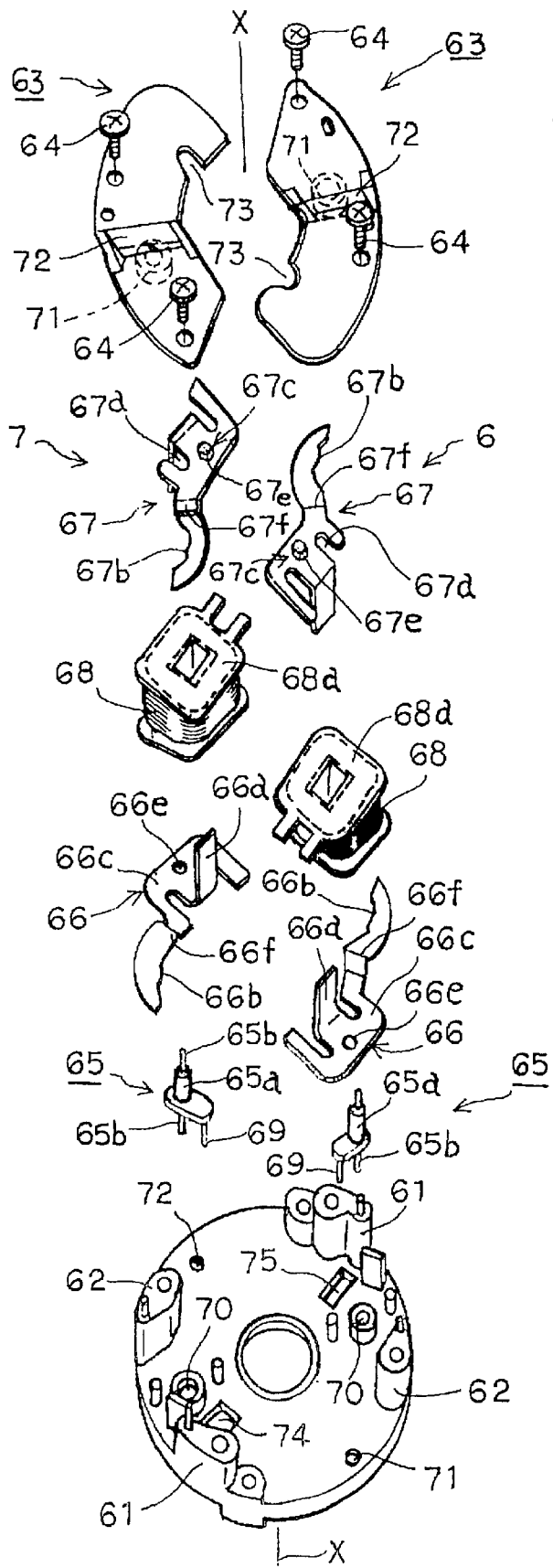
FIG. 2 is a drawing showing an embodiment of the present invention and it is an exploded view showing the back side of a light quantity control apparatus.

Initially, the light quantity control apparatus in the present invention is composed by superposing shutter blades 3, a middle plate 4, and a diaphragm blade 5 in this order between a pair of top and bottom base plates 1 and 2 as shown in FIG. 1. In addition, drive units (actuators) 6 and 7 (shown in FIG. 2), which open and close the shutter blades 3 and the diaphragm blade 5 separately are mounted to one of the base plates (the first base plate 1).

The opened state of the shutter blades 3 is shown at the side of the closed state.

The material of the first base plate 1 is a synthetic resin and is a molded product of, for example, polycarbonate resin mixed with 15% carbon fiber, and it is molded into a shape capable of being integrated to fit with the lens-barrel to be discussed later. As the size of the base plate 1 in the drawing, the diameter is 20 mm in conformance with the recent miniaturization of the lens-barrel.

An aperture 8 is provided to this base plate 1 so that the optical axis indicated with X—X in FIG. 1 is positioned at the center. On the front surface side thereof shown in FIG. 1, pins 9 and 10 composing the rotation axes of the shutter blades 3 and a pin 11 composing the rotation axis of the diaphragm blade 5 are formed integral to the base plate 1. Pin members not integral to the base plate 1 can be mounted to the base plate 1 instead as these pins 9, 10, and 11. It is also possible to dispose these pins on the second base plate 2 side. The number thereof and the arranged positions are determined by the number of shutter blades and diaphragm blades to be discussed later.

On the surface of the aforementioned first base plate 1, protruding guides 12 and 13 are provided for guiding the shutter blades 3 to the vicinity of the aperture 8. In the embodiment shown in the drawing, the shutter blades are composed of two blades thus two protruding guides are provided, namely, the guide 12 for supporting the bottom blade 3a out of the two shutter blades superposed on the first base plate and the guide 13 for supporting the top blade 3b. These protruding guides are formed into a rib shape within the moving track of the respective blade to make the sliding motion of the blades 3a and 3b smooth. As the form thereof, it is possible to arrange plural protrusions a parallel in the moving direction or form a plurality of protrusions in a concentric circle.

The guide 12, which guides the bottom blade 3a out of the two superposed shutter blades, is constituted from a rib of uniform height so as to support the blade with the plane, which crosses the optical axis.

Similarly, even the guide 13, which guides the top blade 3b, is constituted from a rib of uniform height so as to support the blade with the plane, which crosses the optical axis.

Difference in height is provided to these guides 12 and 13 so that a small gap (space) is formed between the superposed blades 3a and 3b. The guide 12, which supports the bottom blade 3a, is low and the guide 13, which supports the top blade 3b, is high.

In the embodiment shown in the drawing, difference in height is set at 0.2 mm for the guides 12 and 13 when thickness of the blade 3a is 0.04 mm so that a gap of 0.16 mm is formed between the blades 3a and 3b.

Note that a slanted surface 12s which gradually becomes higher in the close area of the blade 3a is provided to the aforementioned guide 12. The function of this structure will be discussed later.

With regards to the shutter blades 3, various configurations are already known such as two blades, four blades, etc. but what is indicated in the drawing shows a configuration with two blades as one example. Regular shutter blades are fabricated by die cutting an aluminum thin plate then applying a coating of a black anodic oxide coating. However, in this case, the thickness of the aluminum thin plate is about 0.3 mm, the material is metal, and the specific gravity is high so the inertia of the shutter blades becomes great. In this case, the torque of the drive unit at the start and the bound of the shutter blades at the end create a problem when the blades are opened and closed at a high speed.

Therefore, the shutter blades shown in the drawing are fabricated by die cutting a resin film of thickness 0.04 mm. This resin film is fabricated by annealing a polyester film containing black pigment then applying a mat coating having shielding property.

The two blades 3a and 3b shown in the drawing have arc shape curved parts 31a and 31b on the inside so as to open and close the aperture 8 by dividing into two. Also, the leading ends 32a and 32b thereof are formed to overlap even in the completely opened state. Engaging holes 33a and 33b which mate with the pins 9 and 10 formed to the aforementioned first base plate 1 are formed at the base end parts of the blades and these blades 3a and 3b open and close the aperture by swinging to the left and right with pins 9 and 10 as the center.

After the shutter blades 3 are integrated to the first base plate 1 in the manner noted above, the diaphragm blade 5 is integrated. However, in order to prevent the mutual interference of the shutter blades 3 and the diaphragm blade 5, a middle plate 4 with the following configuration is provided. The middle plate 4 is composed from a flat plate member and is mounted to the first base plate 1, which is integrated with the shutter blades 3, by installing to the projecting parts 15a, 15b, 15c, and 15d provided to the first base plate and forming a small gap between the shutter blades 3. The dimension of this small gap is from 0.2 mm to 0.4 mm. The middle plate 4 has positioning holes 41 and 42, these positioning holes mate with the positioning pins 16 and 17 formed to the first substrate 1, and the position thereof is guaranteed.

Note that the receiving parts 14a and 14b for the securing screws used to mount the second base plate 2 to be discussed later and provided to the first base plate 1 are avoided with the cutout parts 43 in the middle plate 4.

44 denoted in the drawing is the recess hole for the pins 9 and 10 in the base plate 1 and 45 and 46 denoted in the drawing are the recess holes for the transmission member for the drive unit to be discussed later.

Next, the method for forming the middle plate 4 will be explained. This middle plate 4 is fabricated by die cutting a thin plate such as aluminum, etc. according to press working then applying a surface treatment of anodic oxide coating. In this case, the middle plate is mounted to the first base plate by facing the burr surface created by the press working to the diaphragm blade side and the opposite surface to the shutter blade side.

By press working a thin plate and fabricating the middle plate 4 in the manner noted above, it is possible to be made thinner by about a few millimeters when compared with a case of fabricating this by molding a synthetic resin.

The middle plate 4 shown in the drawing is fabricated by die cutting a resin film of thickness 0.04 mm in the same manner as the shutter blades 3. This resin film is fabricated by annealing a polyester film containing, black pigment and then applying a mat coating having shielding property.

Even in this case, the middle plate is mounted on the first base plate by facing the burr surface created in the machining to the diaphragm blade side and the opposite surface to the shutter blade side.

Next, the configuration of the diaphragm blade 5 will be explained. As the diaphragm blade 5, various configurations are known such as the double blade configuration in addition to the single blade configuration shown in the drawin and many of these can be applied to the present invention. The diaphragm blade 5 shown in the drawing is fabricated by die cutting a resin film of 0.04 mm thickness. This resin film is fabricated by annealing a polyester film containing black pigment and then applying a mat coating having shielding property.

Namely, the shutter blade, the middle plate, and the diaphragm blade shown in the drawing are all fabricated by die cutting the same material so these three parts can be die cut in the same process during the manufacturing process. Therefore, the cost merit is great.

To this diaphragm blade 5, an aperture 8, an engaging hole 51 for the pin 11 formed to the first base plate, and a slit 52 which engages with the transmission member of the drive unit to be discussed later are formed.

Note that the pin 11 formed to the first base plate 1 is composed to mate with the engaging hole 51 in the diaphragm blade 5 by penetrating the recess hole 45 in the middle plate 4.

Figure 3A:
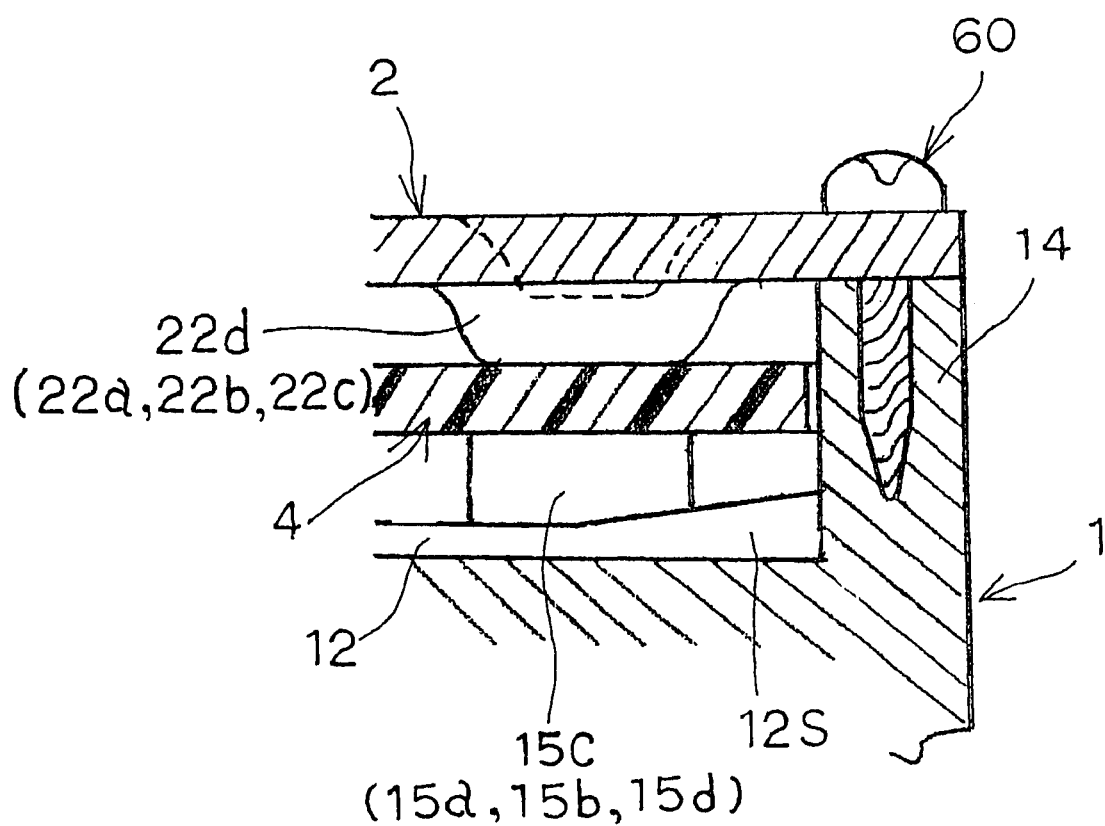
FIG. 3($a$) is a drawing showing an embodiment of the present invention and it is a partial cross-sectional view showing the required parts of a light quantity control apparatus.
Figure 3B:
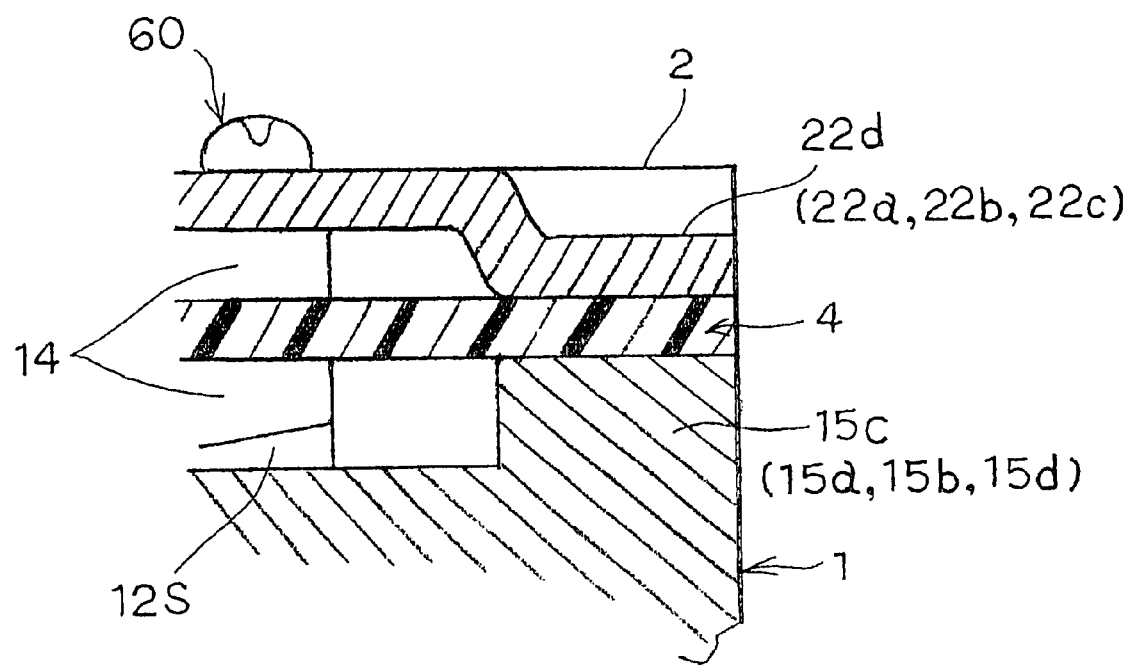
Figure 4:
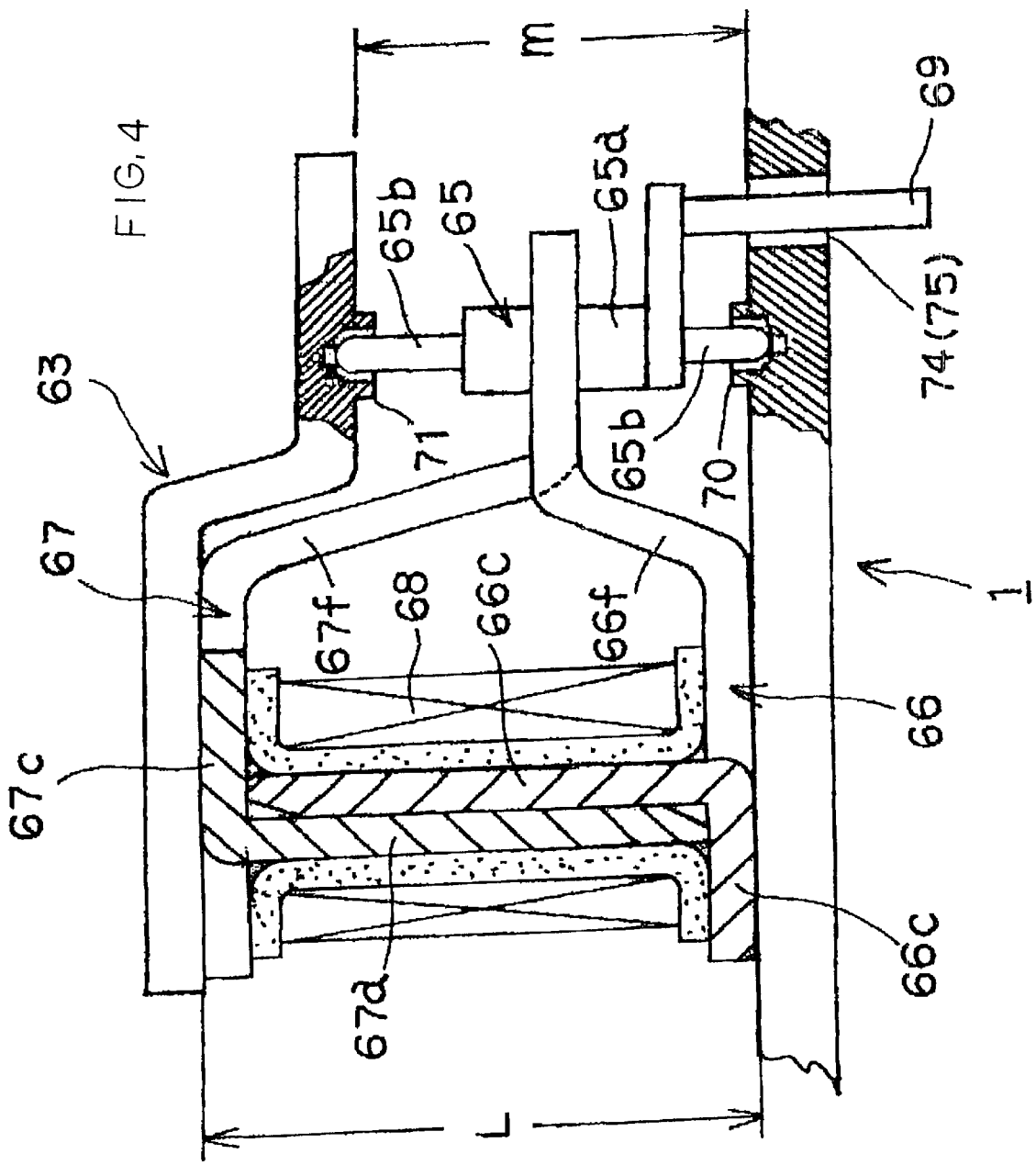
FIG. 4 is a drawing showing an embodiment of the present invention and it is a partial cross-sectional view showing the required parts of a light quantity control apparatus.

As noted above, the shutter blades 3, the middle plate 4, and the diaphragm blade 5 are integrated to the first base plate 1 by being superposed in this order and the configurational parts are fixed by mounting a second base plate 2 on the first base plate 1 in a state of having interposed the middle plate 4 as shown in FIG. 3(a) and FIG. 3(b).

The second base plate 2 is fabricated by punching a metal plate such as aluminum, etc., an aperture 8 is formed at the center part thereof, and holes 21a, 21b, 21c, and 21d which mate with the pins 9, 10, 16, and 17 formed to base plate 1 are formed at the peripheral part. In this second base plate 2, dowel shape projecting parts 22a, 22b, 22c, and 22d projecting toward the back side of the paper surface in FIG. 1 are formed by machining at positions for joining with the projecting parts 15a, 15b, 15c, and 15d of the aforementioned first base plate 1.

Therefore, the aforementioned middle plate 4 is interposed between the projecting parts 15a, 15b, 15c, and 15d of the first base plate 1 and the projecting parts 22a, 22b, 22c, and 22d of the second base plate 2 then fixed by coupling the two base plates with securing screws 60. Also, the shutter blades 3a and 3b are supported between this middle plate 4 and the protruding guides 12 and 13 of the first base plate 1 and the diaphragm blade 5 is supported between this middle plate 4 and the second base plate 2.

Note that what was fabricated by punching a black polyester film into the shape shown in the drawing was shown as said diaphragm blade 5 but it is also possible to adhere a ND filter (neutral density filter) so as to cover the aperture 8 in the diaphragm blade 5.

Next, the drive unit for opening and closing the shutter blades 3 and the diaphragm blade 5 having the aforementioned configuration will be explained.

On the back face of the aforementioned first base plate 1 (shown in FIG. 2), a drive unit 6 for the shutter blades and a drive unit 7 for the diaphragm blade are mounted in identical configuration.

The two drive units 6 and 7 will be described by denoting with identical numbers. Flanges 61 and 62 are formed to the first base plate 1 to be integral to the first base plate 1. Bracket shape holding members 63 are mounted to these two flanges 61 and 62 with securing screws 64. A magnet rotor 65, magnetic force inducing members 66 and 67, and a coil 68 are held between the back face of the first base plate 1 and the holding member 63.

Initially, the magnet rotor 65 is composed integrally by press fitting a shaft member 65b made of a synthetic resin into a cylindrical shape magnet 65a of a ferro-magnetic material (e.g., rare earth magnet) polarized for NS to oppose. An arm shape transmission member 69 is formed integral to this shaft member 65b and this arm shape transmission member 69 engages with the slits 34a, 34b, and 52 in the blade members 3 and 5.

Also, the coil 68 is constituted by winding a conductor in a spiral shape on a coil frame 68a of hollow cylindrical shape (prismatic shape in the coil frame shown in the drawing) and this coil 68 has a cylindrical shape as a whole.

These cylindrical shape magnet rotor 65 and coil 68 are arranged by placing the axial direction at a parallel to the direction of the optical axis (X—X). This is based on the common knowledge that arranging the cylindrical magnet rotor 65 and the coil 68 by conforming the direction can minimize the occupying space of these, and furthermore, that arranging these at a parallel in the direction of the optical axis is most effective.

Said magnet rotor 65 and coil 68 are mounted as follows between the first base plate 1 and the holding member 63. Initially, the magnet rotor 65 is supported rotatably by mating the two ends of the shaft 65b thereof with the mating hole 70 in the first base plate 1 and the mating hole 71 in the holding member 63. The coil 68 is supported by being interposed between a pair of magnetic force inducing members 66 and 67 to be subsequently explained and these magnetic force inducing members 66 and 67 are fixed between the first base plate 1 and the holding member 63.

The coil 68 and the magnet rotor 65 arranged at a parallel as described above are magnetically interlocked such that the magnetic field created in this coil forms 2 poles NS in the pair of magnetic force inducing members 66 and 67 at the periphery of the magnet rotor 65.

Namely, the base end parts 66a and 67a of the magnetic force inducing members 66 and 67 are mated with the hollow open ends of the coil 68. Consequently, the base ends thereof are arranged within the magnetic field created in the coil and the leading ends 66b and 67b of said members are opposingly arranged at the periphery of the magnet rotor 65 with a small space between the magnet rotor 65.

There are mounting parts 66c and 67c at the center section of these magnetic force inducing members 66 and 67. The magnetic force inducing members 66 and 67 are fixed by contacting these mounting parts 66c and 67c to the first base plate 1 and the holding member 63 and securing the holding member with screws.

Mounting parts 66c and 67c are positioned by mating the dowels 66e and 67e formed to these mounting parts with the hole 72 in the first base plate 1 and the hole 73 in the holding member 63. Then, the base end parts 66a and 67a of the magnetic force inducing member 63 are assembled and fixed between the base plate 1 and the holding plate 63 with distance L being maintained as shown in FIG. 1. At this time, the magnetic force inducing members 66 and 67 are provided with bending parts 66f and 67f in at least one section and the leading ends 66b and 67b thereof form magnetic poles at approximately the center of length L in the lengthwise direction of the coil 68.

In the embodiment shown in the drawing, length m in the lengthwise direction of the magnet rotor 65 is shorter than direction L in the lengthwise direction of the coil 68 and has a relationship of L>m. Therefore, whereas the back face of the first base plate 1 is formed to be more or less flat, difference in level 72 is provided on the holding member (bracket) 63 side and a large coil mounting space L and a small rotor mounting space m are formed between the first base plate 1 and the holding member 63.

Therefore, one bending part 66*f* is bent slightly and the other bending part 67*f* is bent greatly in the aforementioned magnetic force inducing members 66 and 67. However, it is preferable for the amount of bending to be equal so that the magnetic resistances of the aforementioned magnetic force inducing members 66 and 67 can be equalized. However, the amount of bending can be biased to one side based on the regulation in the layout of the other configurational parts as shown in the dawings.

The following magnetic fields are created in the aforementioned drive units 6 and 7.

The aforementioned magnet rotor 65 is polarized so that two poles N-S are opposed and set apart by 180 degrees. At the periphery of this magnet rotor 65, the leading ends 66*b* and 67*b* of the pair of magnetic force inducing members 66 and 67 are opposingly arranged and set apart by 180 degrees and the positions of these leading end curved parts 66*b* and 67*b* are set to minimize the distance to the rotor 65 to the utmost.

Figure 5:
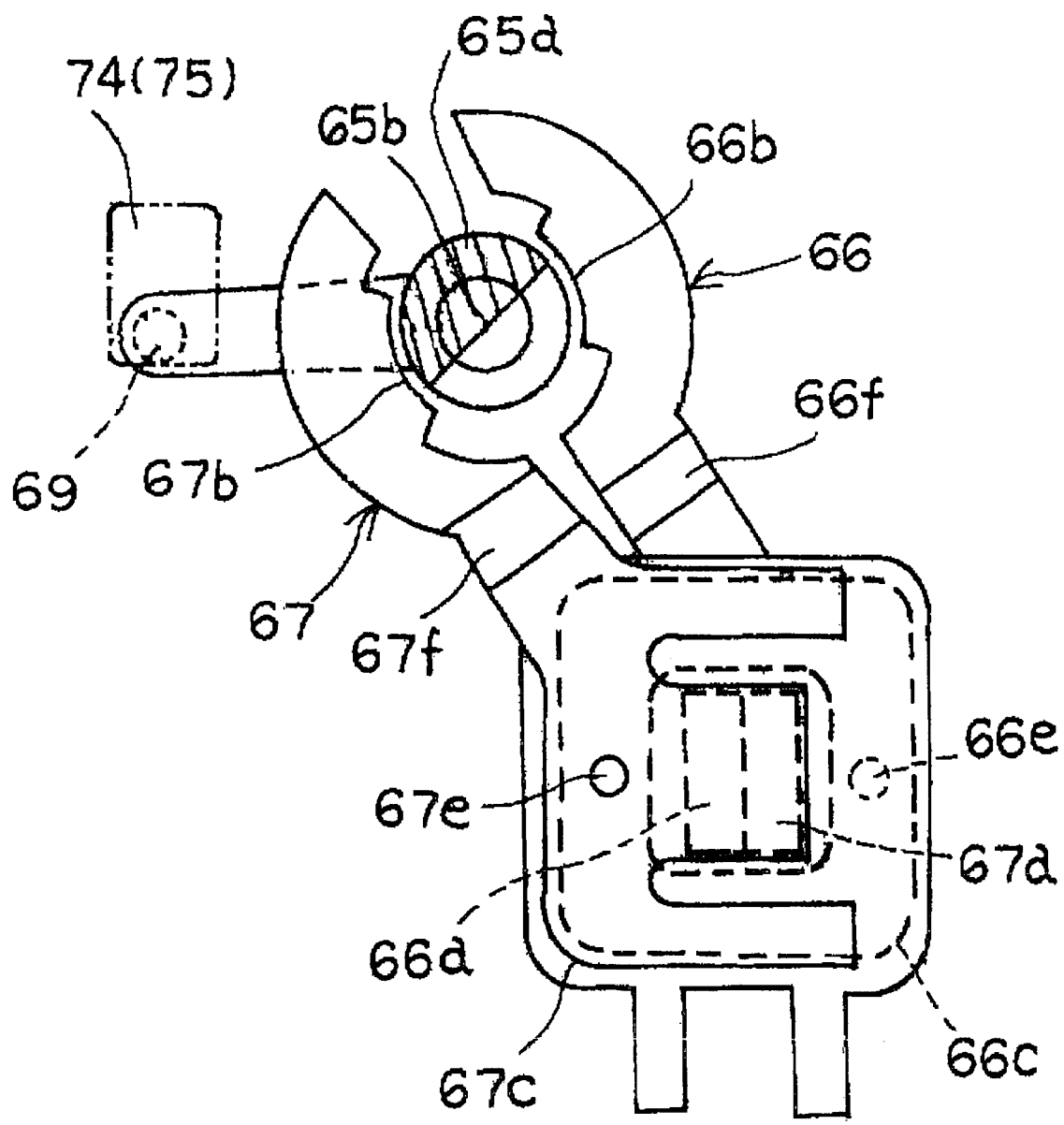
FIG. 5 is a drawing showing an embodiment of the present invention and it is a top view showing the required parts of a drive unit in a light quantity control apparatus.
Figure 6:
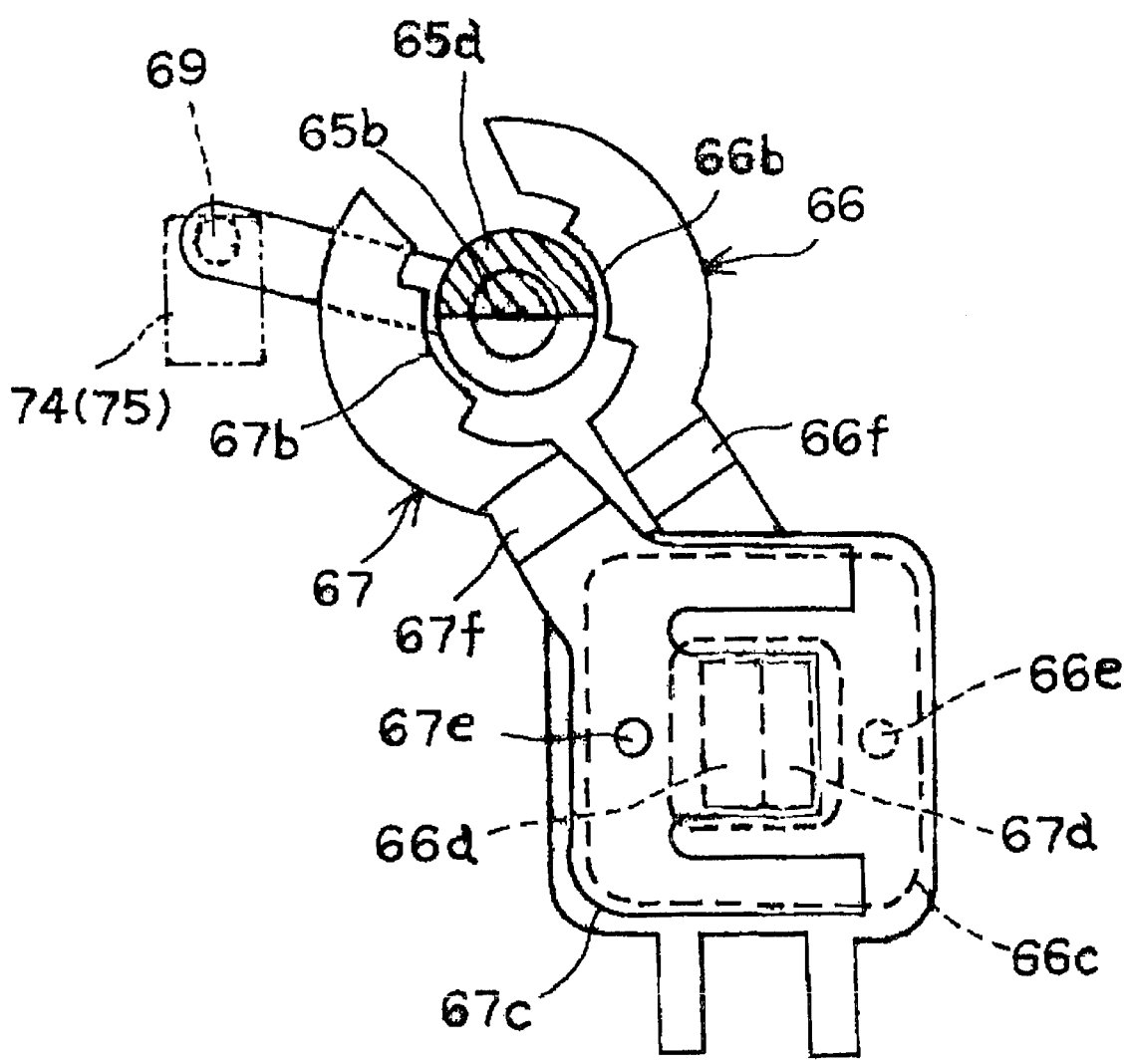
FIG. 6 is a drawing showing an embodiment of the present invention and it is a top view showing the required parts of a drive unit in a light quantity control apparatus.

Therefore, the rotor 65 is constantly being attracted to either the leading end curved part 66*b* or 67*b* which ever is closer during a state of non-conduction to the coil 68. During a state of conduction to the coil 68, magnetic pole of either N-S is formed at the leading end curved parts 66*b* and 67*b* and receives a rotating force in the opposite direction. Then the rotating angle of said rotor 65 is regulated by the slits 74 and 75 formed to the first base plate 1 to be the open position shown in FIG. 5 and the close position shown in FIG. 6. Namely, the rotor 65 in the position shown in FIG. 5 is receiving a rotating force in the counterclockwise direction during a state of non-conduction to the coil, is stopped at the end parts of the slits 74 and 75, and is held at this position.

Next, when electric current is fed to the coil 68 and the same magnetic pole as the magnetic pole of the magnet rotor is formed in the magnetic force inducing members 66*b* and 67*b*, the rotor 65 rotates in the clockwise direction due to the repulsion of magnetism. When the electric current is cutoff at the section passing through the neutral point of the rotation, the magnetic pole of the rotor 65 is attracted to the magnetic force inducing members 66*b* and 67*b* on the opposite side and the rotor 65 rotates in the clockwise direction until being stopped at the end parts of the slits 74 and 75 shown in FIG. 6. The blades take on the closed state from the opened state and are held at this position. Also, when electric current of inverse direction is conducted to the coil 68, the blades take on the opened state from the closed state.

Figure 7:
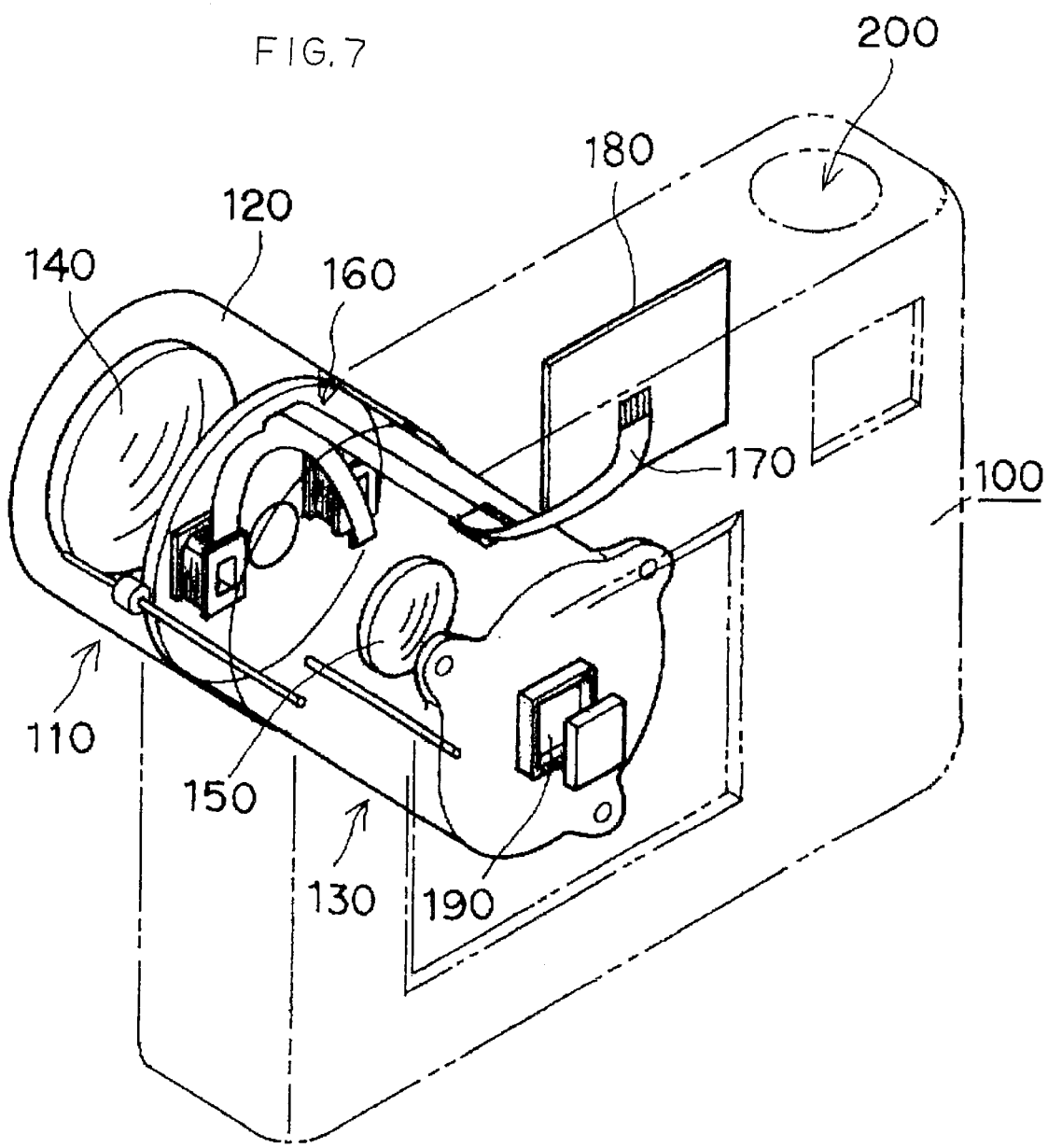
FIG. 7 is a drawing showing an embodiment of the present invention and it is a perspective view showing a camera device integrated with a light quantity control apparatus.

Next, the light quantity control apparatus is incorporated into, for example, a camera device shown in FIG. 7.

The aforementioned light quantity control apparatus (160 in FIGS. 1 and 2) is incorporated between the front lens group 140 and the rear lens group 150 which are mounted in a plurality of lens configurations inside of the lens unit (lens-barrel) 110 provided to the camera body 100.

Then, a photoelectric conversion element 190 such as CCD, which converts light into electricity, is provided to the lens unit 110. Also, this photoelectric conversion element 190 is electrically connected to the control base plate 180 on the camera body 100 side and the timing for feeding power is controlled. A microcomputer for controlling the device is integrated to this control base plate 180 and photography is executed with the operation of a shutter button 200.

Figure 8:
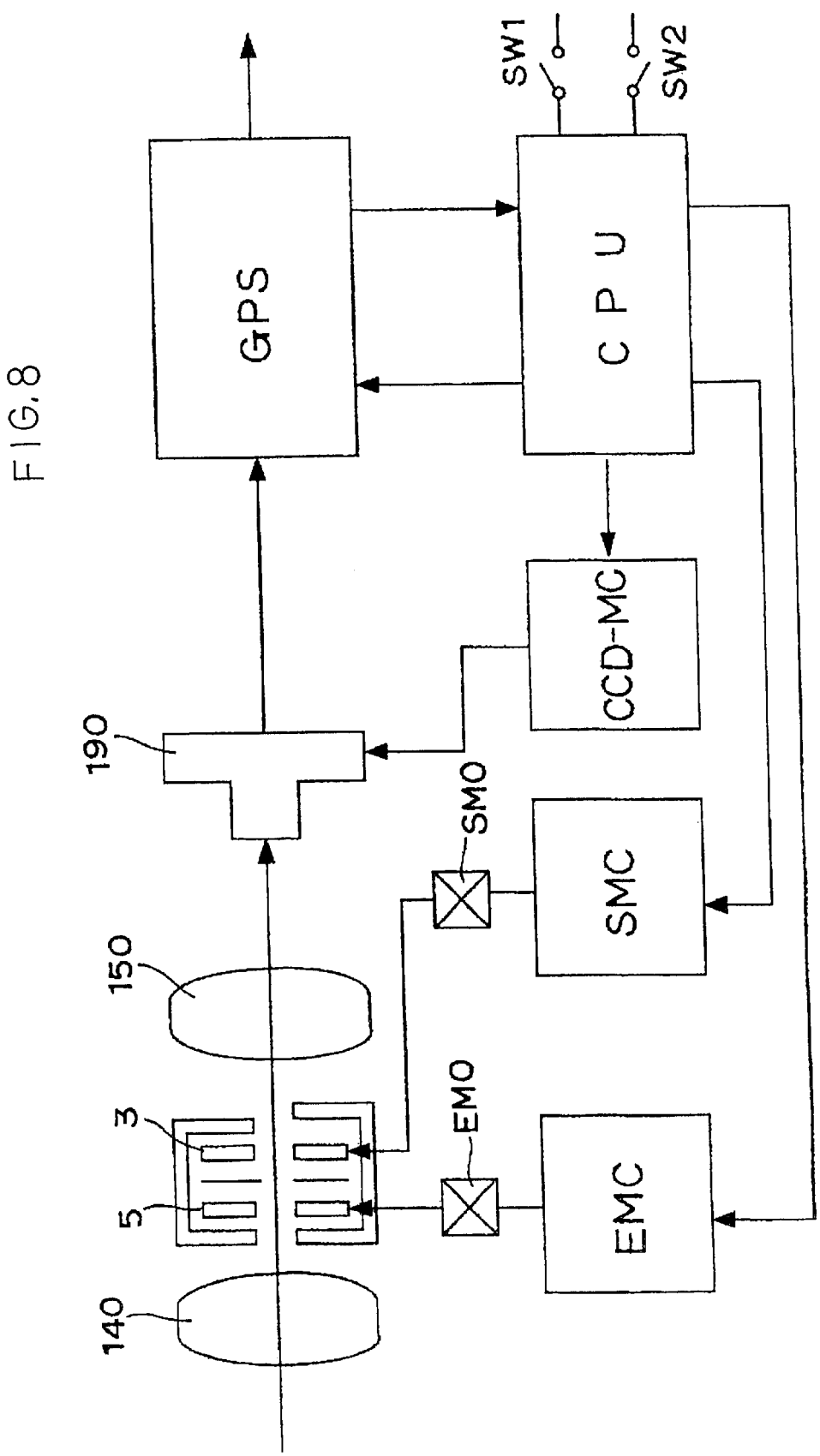
FIG. 8 is a drawing showing an embodiment of the present invention and it is a schematic view showing the control circuit of a camera device integrated with a light quantity control apparatus.

The control circuit of this camera device will be described according to FIG. 8.

3 denotes a shutter blade and 5 denotes a diaphragm blade. EMO denotes an electro-magnetic drive means for driving the diaphragm and SMO denotes an electro-magnetic drive means for driving the shutter. Also, 140 denotes a front lens, 150 denotes a rear lens, 190 denotes a photo-electric conversion element, GPS denotes a picture signal processing circuit which executes a storing process, etc. of picture signals output from the photoelectric conversion element 190, SW1 denotes a release switch operated with a shutter button 200, SW2 denotes a main switch, and CPU denotes a microcomputer. Furthermore, SMC denotes a shutter driving circuit which feeds drive signals to the electro-magnetic drive means SMO, EMC denotes a diaphragm driving circuit which feeds drive signals to the electro-magnetic drive means EMO, and CCD-MC denotes an electronic shutter control circuit which controls the charge storage and charge discharge in the photoelectric conversion element 190.

Figure 9:
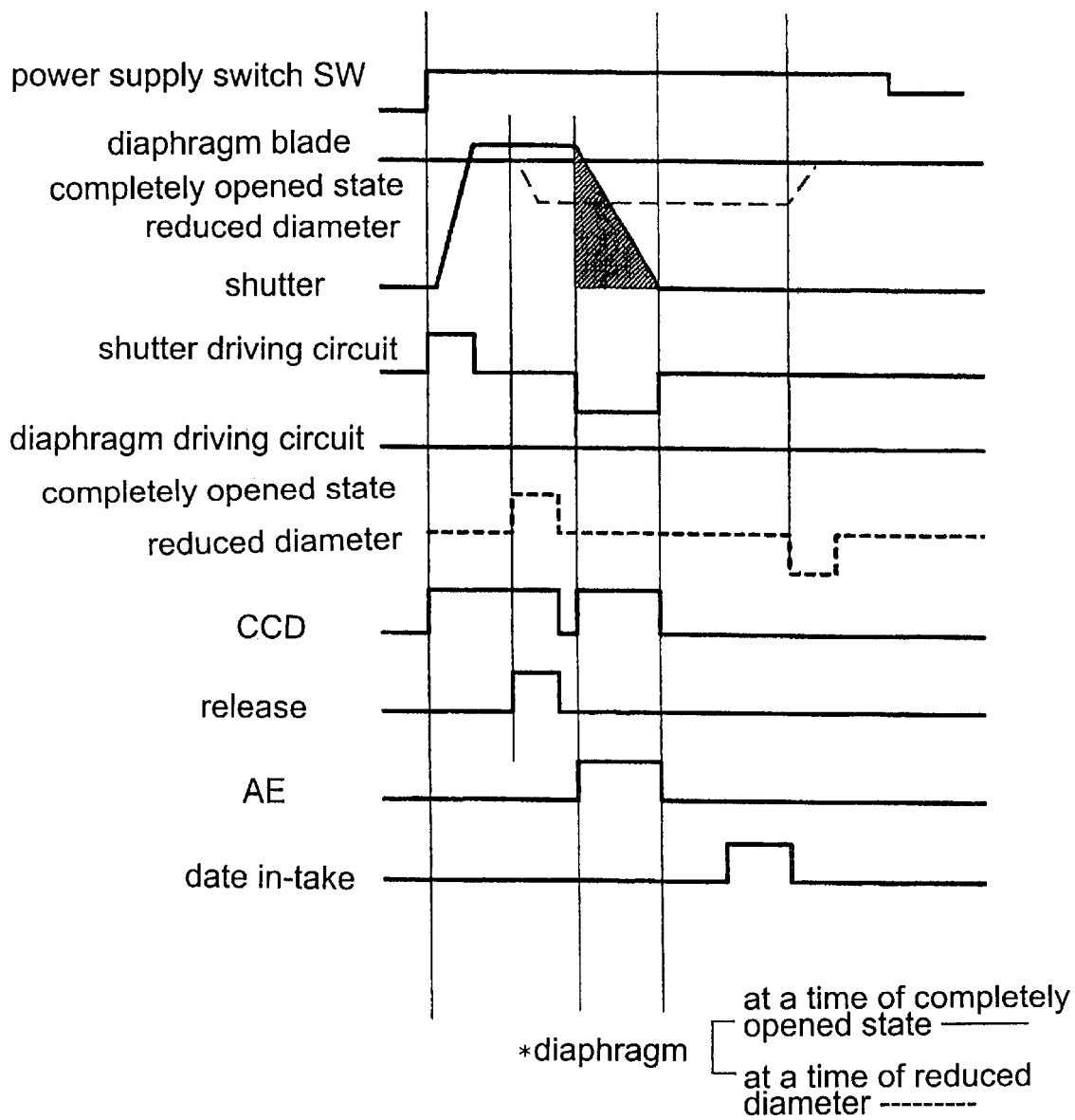
FIG. 9 is a drawing showing an embodiment of the present invention and it is a timing chart for a camera device integrated with a light quantity control apparatus.

The operation of the device will be described according to FIG. 9.

In the non-operating state of the device, the shutter blades 3 are initially set in the opened state shown on the right side of FIG. 1 and the diaphragm blade 5 is in the completely opened state indicated with the solid line in FIG. 1.

When power is input to the camera main body in this state and set to the photographing state, light from the subject is received in the CCD and the aforementioned microcomputer sets the diaphragm value. The diaphragm values indicated in the drawing are in two stages and the microcomputer sets to either the completely opened state (the state indicated with the solid line in FIG. 1) at which the diaphragm blade does not regulate the aperture 8 and the closed state (the state indicated with the diagonal double dash line in FIG. 1) at which the aperture is reduced to a small diameter. Presently, if the shutter button 200 is operated and the microcomputer sets the aperture to a reduced diameter, the diaphragm driving circuit EMO functions to apply an electric current to the coil 68 of the drive unit 7. Then, the diaphragm blade 5 moves to the state indicated with the diagonal double dash line in FIG. 1 from the state indicated with the solid line in FIG. 1 and the aperture 8 takes on a state of reduced diameter. Then, even after the supply of power is cutoff, the blade 5 maintains a state of reduced diameter due to the magnet 65*a* of the magnet rotor 65 being attracted to the magnetic force inducing member 66*b*. Also, the aforementioned microcomputer computes the exposure time, resets the charge in the photoelectric conversion element 190 after the lapse of a prescribed delay time, and generates an instruction signal to close the shutter blades 3. Then, the light from the subject is stored as charge in the photoelectric conversion element 190, which was reset. The shutter driving circuit SMC then receives an indication signal to close the blades 3 and applies a predetermined current to the coil 68 of the drive unit 6. Then, the shutter blades 3 become closed as indicated on the left side of FIG. 1 from the opened state indicated on the right side of FIG. 1, storage of charge in the photoelectric conversion element 190 ends, and this charge is transmitted to an internal or an external memory from the picture signal processing circuit GPS with the receiving of a signal from the computer then stored as picture signals. Thereafter, by current being fed to the drive unit 7 of the diaphragm blade 5 based on the signal from the computer, this blade evacuates from the aperture 8. By the shutter blade 4 also being fed with current at the drive coil thereof, restoration is made to the opened state from the closed state. Then, it stands by for the next photographing operation.

Note that if the aforementioned microcomputer has set the diaphragm value to the completely opened state, a signal is not generated in the aforementioned diaphragm drive circuit EMC and current is not fed to the aforementioned drive unit 7. Therefore, the diaphragm blade 5 is in a state of having maintained the completely opened state.

In the process of the operations just described, the aforementioned shutter blade 3 reciprocates inside the slit by the drive unit 6. However, when closing the blade 3, the rebounding phenomenon occurs because the transmission member 69 on the drive unit 6 strikes the edge of the slit 75 and returns to the opposite direction. The amount of the rebounding increases according to the speed that the blades are closed causing the problem re-exposure when the once closed shutters are opened again. The figures show having a protruding guide 13 (first guide member) to guide the upper level blades overlapped on the first base plate 1 and the protruding guide 12 (second guide member) to guide the lower level blades being disposed, the first and the second guide members 12 and 13 side being higher and the level difference larger than the thickness of the blades. In addition, the inclined surface 12s is formed on the second guide member 12 in the closing region of the blade (see FIG. 1), with the height difference to the first guide member either smaller than the thickness of the blade or conversely, the second guide member being higher.

Therefore, the shutter blade 3 is guided on the guide members 12 and 13 to maintain the gap with blades mutually facing from the opened position to the closed position and guided to raise the blades mutually while touching, near the closing position. The braking operates between the blades mutually and the guide members 12 and 13 and is then stopped by the stopper means composed of the slit 75 edge, described above. Rebounding is prevented using this kind of braking effect.

Note that the present embodiment discloses forming the inclined surface 12s in the closing region of the shutter blade 3. However, it is obviously acceptable to form an inclined surface in the same way in the opening region of the second guide member.

Figure 10:
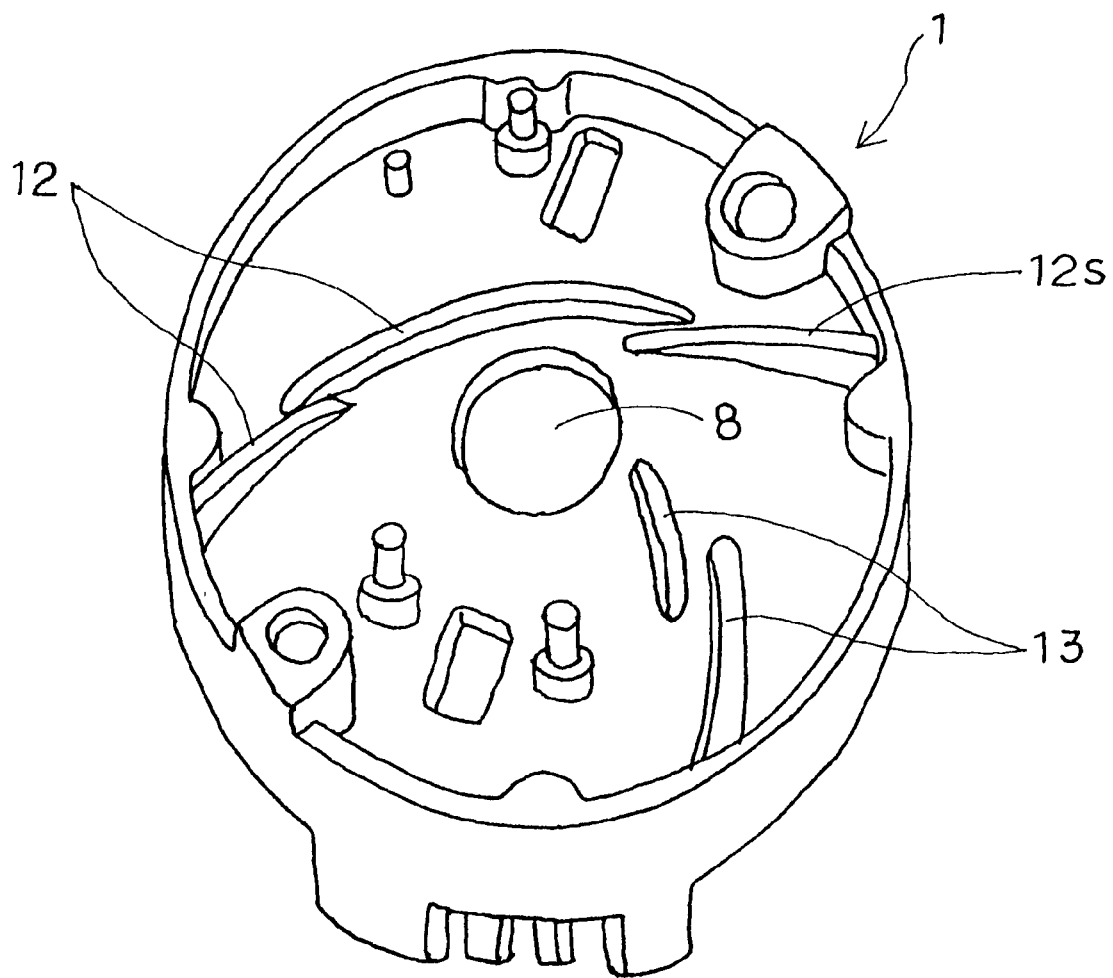
FIG. 10 is a drawing showing another embodiment of the present invention and it is a perspective view of the essential parts of a light quantity control apparatus.

Also, as a different embodiment shown in FIG. 10, it is also acceptable to have a structure using a plurality of protrusions for the protruding guide 12 and protruding guide 13 forming the base plate 1.

This invention comprises the configuration described above and enables the provision of a light quantity apparatus that can open or close the blade members at a comparatively high speed and reduce the rebounding that occurs in the blades.

What is claimed is:

1. A light quantity control apparatus, comprising:

a first base plate having an optical axis opening, at least one drive means mounted on the first base plate, a shutter blade mounted on said first base plate and engaging the at least one drive means, an intermediate plate disposed above the shutter blade, a diaphragm blade disposed above the intermediate plate, a second base plate disposed above the diaphragm blade, and a protruding guide formed on said first base plate to support the shutter blade thereon and having a closing region where the shutter blade completely closes the opening, an opening region where the shutter blade opens the opening, and an inclined surface formed at at least one of the closing region and the opening region, said inclined surface gradually narrowing a gap with respect to said intermediate plate at an end of the region thereof so that a speed of movement of the shutter blade is reduced by the inclined surface to prevent rebounding thereof.

2. The light quantity control apparatus according to claim 1, wherein said shutter blade is formed by at least two vertically overlapping upper and lower blade materials, said protruding guide is composed of a first guide member to guide the upper blade material and a second guide member to guide the lower blade material, and said second guide member is formed with the inclined surface.

3. The light quantity control apparatus according to claim 1, wherein said protruding guide is formed of a plurality of protrusion guide members formed in said opening and closing regions.

4. The light quantity control apparatus according to claim 2, wherein said first guide member and said second guide member are structured such that said first guide member us located higher than the second guide member, said gap having a part having a level difference greater than the thickness of said shutter blade and a part with a level difference smaller than said thickness at the inclined surface portion.

5. The light quantity control apparatus according to claim 2, wherein said protruding guide is formed of a plurality of protrusion guide members formed in said shutter blade opening and closing regions.

6. The light quantity control apparatus according to claim 1, further comprising connecting means to interconnect said at least one drive means and said shutter blade, and stopper means to regulate the movement of said shutter blade at the opening region and the closing region.

7. The light quantity control apparatus according to claim 6, wherein said stopper means is a penetrated groove for said connecting means formed in said first base plate.

* * * * *